(12) United States Patent
Yang

(10) Patent No.: US 11,593,894 B2
(45) Date of Patent: Feb. 28, 2023

(54) INTEREST RECOMMENDATION METHOD, COMPUTER DEVICE, AND STORAGE MEDIUM

(71) Applicant: Tencent Technology (Shenzhen) Company Limited, Shenzhen (CN)

(72) Inventor: Chunfeng Yang, Shenzhen (CN)

(73) Assignee: Tencent Technology (Shenzhen) Company Limited, Guangdong (CN)

(*) Notice: Subject to any disclaimer, the term of this patent is extended or adjusted under 35 U.S.C. 154(b) by 254 days.

(21) Appl. No.: 16/909,682

(22) Filed: Jun. 23, 2020

(65) Prior Publication Data

US 2020/0320646 A1 Oct. 8, 2020

Related U.S. Application Data

(63) Continuation of application No. PCT/CN2019/076164, filed on Feb. 26, 2019.

(30) Foreign Application Priority Data

Apr. 26, 2018 (CN) .......................... 2018103876928

(51) Int. Cl.
*G06Q 10/00* (2023.01)
*G06Q 50/00* (2012.01)
(Continued)

(52) U.S. Cl.
CPC ........... *G06Q 50/01* (2013.01); *G06K 9/6215* (2013.01); *G06K 9/6224* (2013.01); *G06N 5/04* (2013.01)

(58) Field of Classification Search
CPC ..................................................... G06Q 50/01
See application file for complete search history.

(56) References Cited

U.S. PATENT DOCUMENTS 7,734,680 B1 * 6/2010 Kurapati ............... G06F 16/437
725/53
9,473,730 B1 * 10/2016 Roy ....................... H04H 60/33
(Continued)

FOREIGN PATENT DOCUMENTS

CN 103116614 A 5/2013
CN 103345503 A 10/2013
(Continued)

OTHER PUBLICATIONS

Yang, et al. ("Who Are Like-Minded: Mining User Interest Similarity in Online Social Networks." Proceedings of the Tenth International AAAI Conference on Web and Social Media (ICWSM 2016) (Year: 2016).*
(Continued)

*Primary Examiner* — Gabrielle A McCormick
(74) *Attorney, Agent, or Firm* — Crowell & Moring LLP

(57) ABSTRACT

This application relates to an interest recommendation method, a computer device, and a storage medium. The method includes: obtaining feature information of a target user; predicting interest similarities between the target user and a user group according to the feature information by using an interest similarity prediction model, the interest similarity prediction model being implemented according to an interest similarity between each pair of users in a sample set of historical records of users based on a hybrid tree-encoded linear model algorithm, the hybrid tree-encoded linear model algorithm being implemented based on a tree model and a linear model; determining, according to the interest similarities, recommended users in the user group having interests similar to those of the target user; and obtaining an interest list of the recommended users, and creating a recommendation list for the target user according to the interest list.

15 Claims, 10 Drawing Sheets

(51) Int. Cl.
G06K 9/62 (2022.01)
G06N 5/04 (2023.01)

(56) References Cited

U.S. PATENT DOCUMENTS

| | | | |
|---|---|---|---|
| 2006/0224552 | A1 | 10/2006 | Reizler et al. |
| 2009/0019488 | A1* | 1/2009 | Ruiz-Velasco ............................ H04N 21/25891 725/43 |
| 2011/0250960 | A1* | 10/2011 | Nguyen ................. G06Q 30/02 463/31 |
| 2013/0031216 | A1* | 1/2013 | Willis .................... G06Q 50/01 709/219 |
| 2013/0081081 | A1* | 3/2013 | Wang ............... H04N 21/25875 725/38 |
| 2013/0263168 | A1* | 10/2013 | Choi .................. H04N 21/2668 725/14 |
| 2013/0339352 | A1* | 12/2013 | Jin ...................... G06F 16/9024 707/736 |
| 2015/0248651 | A1* | 9/2015 | Akutagawa ......... G06F 16/2465 705/7.19 |
| 2016/0227464 | A1* | 8/2016 | Senarath .......... G08G 1/096716 |
| 2016/0357845 | A1* | 12/2016 | Yu .......................... G06F 17/16 |
| 2017/0098197 | A1* | 4/2017 | Yu .......................... G16H 10/60 |
| 2017/0195731 | A1* | 7/2017 | Girlando .............. H04N 21/251 |
| 2018/0013846 | A1* | 1/2018 | Lu .......................... H04L 51/32 |
| 2018/0046851 | A1* | 2/2018 | Kienzle ................ G06V 40/165 |
| 2018/0075512 | A1* | 3/2018 | Bui ........................... G06F 7/08 |
| 2019/0179615 | A1* | 6/2019 | Liu ..................... G06F 16/9024 |

FOREIGN PATENT DOCUMENTS

| | | |
|---|---|---|
| CN | 104915861 A | 9/2015 |
| CN | 105809479 A | 7/2016 |
| CN | 106708953 A | 5/2017 |
| CN | 106709076 A | 5/2017 |
| CN | 106933821 A | 7/2017 |
| CN | 107169573 A | 9/2017 |
| CN | 107169574 A | 9/2017 |
| CN | 107273438 A | 10/2017 |
| CN | 107563542 A | 1/2018 |
| CN | 108763314 A | 11/2018 |

OTHER PUBLICATIONS

Wikipedia (retrieved at: https://web.archive.org/web/20180312061750/https://en.wikipedia.org/wiki/Cosine_similarity) (Year: 2018).*
Office Action for Chinese Patent Application No. CN 2018103876928 dated May 25, 2020; 10 pages.
International Search Report and Written Opinion for International Patent Application No. PCT/CN2019/076164 dated May 30, 2019; 13 pages.
Chen, M.J., "Efficient Hybrid Tree/Linear Array Architectures for Block-Matching Motion Estimation Algorithms", IEE Proceedings—Vision, Image and Signal Processing, vol. 143, No. 4, Aug. 31, 1996, 6 pages.
Di, Shao, "Dissertation for the Master Degree in Engineering: Research on High Level Feature Representation and Predicting Methods in Online Advertising", China Academic Journal Electronic Publishing House, Feb. 15, 2015, 74 pages.

* cited by examiner

INTEREST RECOMMENDATION METHOD, COMPUTER DEVICE, AND STORAGE MEDIUM

RELATED APPLICATION

This application is a continuation application of the International PCT Application No. PCT/CN2019/076164, filed with the China National Intellectual Property Administration on Feb. 26, 2019 which claims priority to Chinese Patent Application No. 2018103876928, entitled "INTEREST RECOMMENDATION METHOD, APPARATUS, SERVER, AND STORAGE MEDIUM" and filed with the China National Intellectual Property Administration on Apr. 26, 2018, which are incorporated herein by reference in their entireties.

FIELD OF THE TECHNOLOGY

This application relates to the field of Internet technologies, and in particular to a method, an apparatus, a server, and a storage medium for interest recommendation.

BACKGROUND OF THE DISCLOSURE

Interest recommendation such as video recommendation has become an indispensable part of an online video service. Existing video recommendation algorithms are mainly classified into non-personalized recommendation algorithms and personalized recommendation algorithms. Referring to FIG. 1, data used in the algorithms mainly includes information such as a portrait or profiling of a user, video viewing records of the user, and attributes of a video. The non-personalized recommendation algorithms include a popularity-based video recommendation algorithm and artificial statistical information-based user grouping in cooperation with popularity-based video recommendation. Personalized recommendation mainly includes related recommendation based on a video currently viewed by a user and personalized recommendation based on historical preferences (that is, historical viewing records) of a user. For the personalized recommendation, the related recommendation is a method based on an association rule (AR); and the personalized recommendation based on historical preferences includes collaborative filtering (CF) recommendation and content-based (CB) recommendation.

Currently, popular video recommendation algorithms include CB recommendation, CF recommendation, and social recommendation. A common disadvantage of these algorithms is that conventional video recommendation algorithms usually cannot solve the cold-start problem and the data sparsity problem, that is, if the user does not have sufficient viewing records, these algorithms may not satisfy user's requirement.

With regard to CF recommendation and CB recommendation, historical viewing behavioral data of a user needs to be used, for a new user or a user with less behaviors, the methods cannot be used or have poor performance. The problems affect user experience, and further, affect user stickiness and long-term development of video services.

A conventional method for resolving cold-start problem is to cluster users, for example, to search for users that are of similar age, that are same gender, that are in geographical proximity, or that are in a same community.

SUMMARY

To solve the foregoing problems, various embodiments of this application provide a method, a computer device, and a computer-readable storage medium for interest recommendation such as video recommendation.

An interest recommendation method is provided, performed by a computer device, the method including:
  obtaining feature information of a target user;
  predicting interest similarities between the target user and a user group according to the feature information by using an interest similarity prediction model, the interest similarity prediction model being implemented according to an interest similarity between each pair of users in a sample set of historical records of users based on a hybrid tree-encoded linear model algorithm, the hybrid tree-encoded linear model algorithm being implemented based on a tree model and a linear model;
  determining, according to the interest similarities, recommended users in the user group having interests similar to those of the target user; and
  obtaining an interest list of the recommended users, and creating a recommendation list for the target user according to the interest list.

A computer device is provided, including a processor and a memory, the memory storing a computer-readable instruction, the computer-readable instruction, when executed by the processor, causing the processor to perform the following operations:
  obtaining feature information of a target user;
  predicting interest similarities between the target user and a user group according to the feature information by using an interest similarity prediction model, the interest similarity prediction model being implemented according to an interest similarity between each pair of users in a sample set of historical records of users based on a hybrid tree-encoded linear model algorithm, the hybrid tree-encoded linear model algorithm being implemented based on a tree model and a linear model;
  determining, according to the interest similarities, recommended users in the user group having interests similar to those of the target user; and
  obtaining an interest list of the recommended users, and creating a recommendation list for the target user according to the interest list.

A non-transitory computer-readable storage medium is provided, storing a computer-readable instruction, the computer-readable instruction, when executed by one or more processors, causing the one or more processors to perform the following operations:
  obtaining feature information of a target user;
  predicting interest similarities between the target user and a user group according to the feature information by using an interest similarity prediction model, the interest similarity prediction model being implemented according to an interest similarity between each pair of users in a sample set of historical records of users based on a hybrid tree-encoded linear model algorithm, the hybrid tree-encoded linear model algorithm being implemented based on a tree model and a linear model;
  determining, according to the interest similarities, recommended users in the user group having interests similar to those of the target user; and
  obtaining an interest list of the recommended users, and creating a recommendation list for the target user according to the interest list.

Details of one or more embodiments of this application are provided in the accompany drawings and description below. Other features, objectives, and advantages of this application become apparent from the specification, the accompanying drawings, and the claims.

BRIEF DESCRIPTION OF THE DRAWINGS

To describe the technical solutions in the embodiments of this application more clearly, the following briefly describes the accompanying drawings required for describing the embodiments or the related technology. Apparently, the accompanying drawings in the following description show merely some embodiments of this application, and a person of ordinary skill in the art may still derive other drawings from the accompanying drawings without creative efforts.

DESCRIPTION OF EMBODIMENTS

To make the objectives, technical solutions, and advantages of this application clearer, the following further describes this application in detail with reference to the accompanying drawings. Apparently, the described embodiments are only some embodiments rather than all the embodiments of this application. All other embodiments obtained by a person skilled in the art based on the embodiments of this application without creative efforts shall fall within the protection scope of this application.

In a recommendation system, a cold-start represents a problem that a volume of data accumulated by the system is low, and a personalized recommendation cannot be made for a new user. This is a difficult problem in product recommendation. Basically, cold-start problems may be classified into the following three types:

User cold-start: For a user cold-start, the problem relates to how to make a personalized recommendation for a new user. When a new user first joins, there is no behavioral data of the new user, and therefore, an interest of the new user cannot be predicted according to historical behaviors of the new user, and consequently, no personalized recommendation can be made for the new user accordingly.

Item cold-start: For an item cold-start, the problem relates to how to recommend a new item to a user who may possibly be interested in the new item.

System cold-start: For a system cold-start, the problem relates to how to design a personalized recommendation system on a newly-developed or newly-launched system, for example, a website (there is only information about some items, but there is no user or user behavior information), to enable a user to experience a personalized recommendation service.

The embodiments of this application provide a method for handling a user cold-start in a recommendation system.

Figure 1:
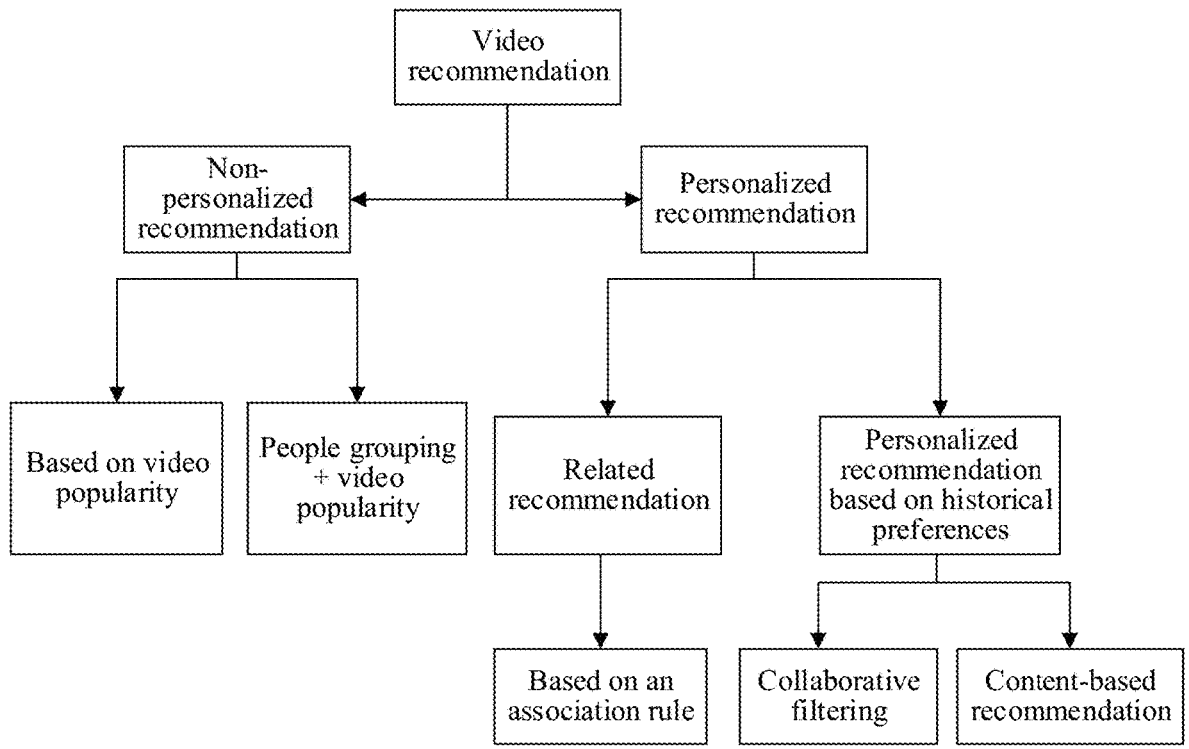
FIG. 1 is a diagram of a classification structure of a video recommendation algorithm in the related art.
Figure 2:
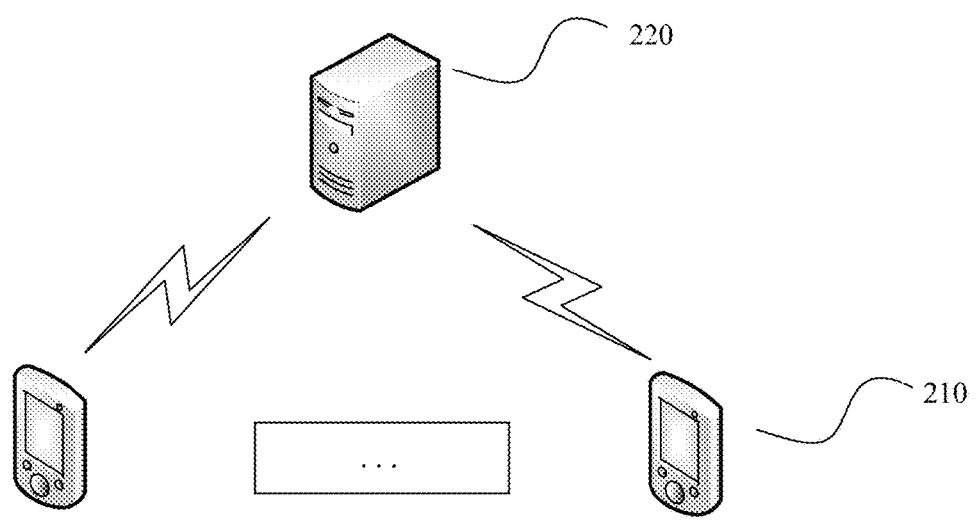
FIG. 2 is a schematic diagram of an implementation environment according to an embodiment of this application.

FIG. 2 shows a schematic diagram of an implementation environment according to an embodiment of this application. The implementation environment includes: several terminal devices 210 and a server 220. The terminal device 210 may be, but is not limited to, a terminal device such as a mobile phone, a tablet computer, or a desktop computer. The server 220 may be one server, a server cluster including a plurality of servers, or a cloud computing service center.

The terminal device 210 may communicate with various networks such as the Internet, an enterprise intranet, and a wireless network. The foregoing wireless network may include a cellular telephone network, a wireless local area network, or a metropolitan area network. Various communication standards, protocols, and technologies may be used for the foregoing wireless network. The terminal device 210 transmit a request to the server 220 through a network, and the server 220 receives the request and performs processing.

In an actual application scenario, the server 220 may obtain user information of the several terminal devices 210, calculate a user interest similarity according to the obtained user information, provide related recommendations for the user according to the interest similarity, and finally implement personalized recommendations for the user.

Common supervised machine learning algorithms include linear model and tree model. Advantages of the linear model, for example, linear regression, are simplicity and easy application to a large-scale data set, and the disadvantage thereof is incapability of fitting nonlinear associations. On the other hand, advantages of the tree model, for example, a decision tree, are the capability of fitting non-linear associations and applicability to discrete features as well as continuous features, and disadvantages thereof are higher complexity and poor performance in capturing a linear relationship or an approximate linear relationship.

Figure 3:
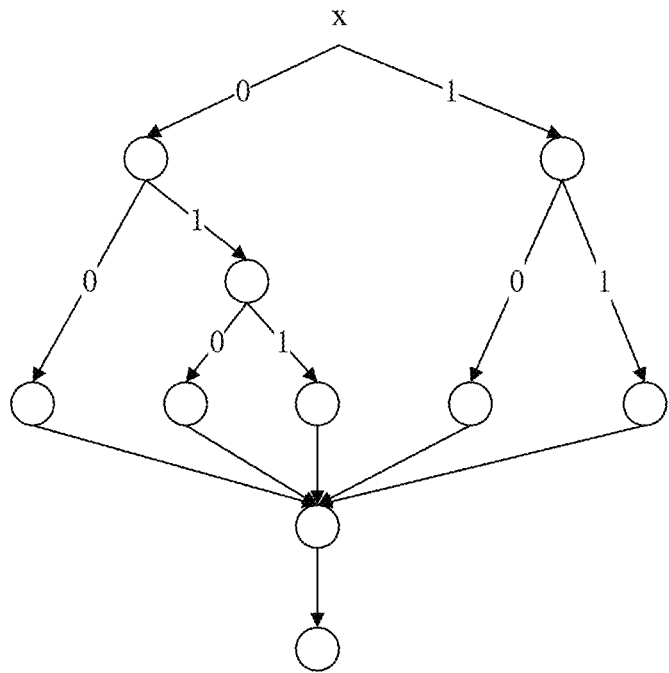
FIG. 3 is a schematic model diagram of a hybrid tree-encoded linear model according to an embodiment of this application.

To take advantages of both types of models, the embodiments of this application provide a hybrid tree-encoded linear model, shown in FIG. 3, and the algorithm mainly includes two steps. Specifically, to enhance the final non-linear expression capability, non-linear transformation is first performed on the features by using a gradient boost decision tree (GBDT), that is, original features are transformed into a series of binary features, similar to encoding. Further, all the features after encoding, that is, the binary features and all the original features, are put together into a linear regression model as input features for training (the training may be performed by using a gradient descent method), to obtain a final hybrid model. The trained model is evaluated on a test dataset for prediction result, so that the performance characteristics and effect of the model can be determined.

Figure 4:
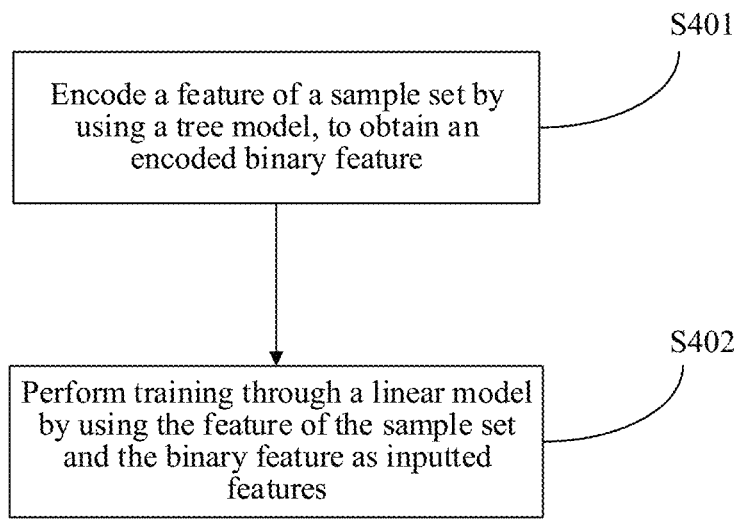
FIG. 4 is a flowchart of a hybrid tree-encoded linear model according to an embodiment of this application.

FIG. 4 shows a flowchart of a hybrid tree-encoded linear model according to an embodiment of this application, including the following steps.

S401. Encode a feature of a sample set by using a tree model, to obtain a binary feature after encoding.

For example, training data is fitted by using a GBDT with two subtrees, and a fitting result is that the first subtree has three leaf nodes, and the second subtree has two leaf nodes. In a case that after passing through the GBDT, a sample falls into the second leaf node in the first subtree (that is, being encoded into 010, each bit corresponding to a leaf node) and falls into the first leaf node in the second subtree (that is, being encoded into 10), finally, an combined encoding result of the sample is 01010, corresponding to five binary features.

S402. Perform training through a linear model by using the feature of the sample set and the binary feature as input features.

Further, all the features after encoding, that is, the five binary features and all the original features, are put together into a linear regression model as input features for training (the training may be performed by using a gradient descent method), to obtain a final hybrid model result. The trained model is evaluated on a test dataset for prediction result, so that the performance characteristics and effect of the model can be determined.

Figure 5:
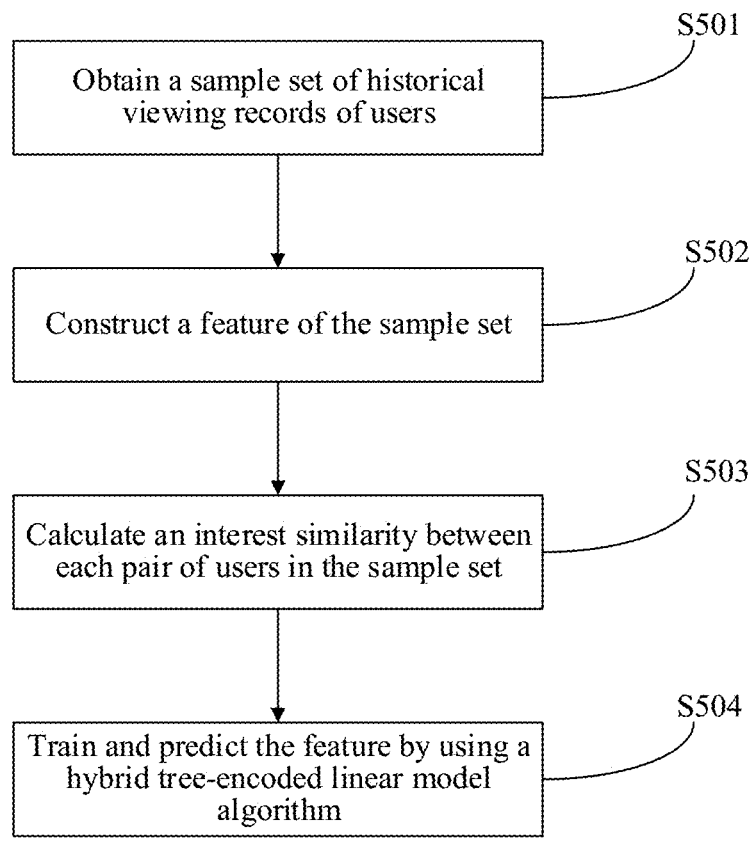
FIG. 5 is a flowchart of a method for generating an interest similarity prediction model according to an embodiment of this application.

FIG. 5 shows a flowchart of a method for generating an interest similarity prediction model according to an embodiment of this application, specifically including the following steps.

S501. Obtain a sample set of historical viewing records of users.

Since supervised machine learning is used, labeled samples need to be constructed for learning. For example, one million pairs of users are randomly selected from a historical viewing record table of the past month, and each pair of users are active users (for example, the quantity of viewed videos for a user >=30).

S502. Construct a feature of the sample set.

To construct an effective supervised machine learning algorithm, data preparations (feature construction and selection) need to be performed separately.

As an input of machine learning algorithm, a feature of the samples needs to be constructed.

For the one million pairs of users, the following features may be designed:

for example, a demographic feature, a social network software usage feature, a network behavioral feature, a social cultural background feature, and a historical interest similarity feature.

The demographic feature includes at least one of the following information: an age, an age difference, a region, a gender, and the like.

The social network software usage feature includes at least one of the following information: being a friend in a social network software (for example QQ, WeChat, Facebook, Instagram, Twitter, Want Want, Dingding, Alipay, MSN, Weibo, or Yixin) or not, a historical interaction record (for example, a messaging frequency, a quantity of transmitted messages, a quantity of common friends, a quantity of common groups, or a quantity of mutually sent messages or emails), an online duration, a usage frequency, and the like.

The network behavioral feature includes at least one of the following information: a highly frequently browsed website, page views, a visit duration, a followed topic or official account, and the like.

The social cultural background feature includes at least one of the following information: education, a school of graduation, an occupation, a place of employment, a hobby, and the like.

The historical interest similarity feature includes at least one of the following information: an interest similarity in the past three months, an interest similarity in the past half year, an interest similarity in the past year, and the like.

S503. Calculate an interest similarity between each pair of users in the sample set.

An interest similarity between a user u and a user v is defined as:

$$S^l(u, v) = \frac{|I_u \cap I_v|}{\sqrt{|I_u|} * \sqrt{|I_v|}}$$

where $I_u$ and $I_v$ are respectively sets of lists of videos viewed by the user u and the user v historically (for example, in the past month). Herein, a cosine similarity between historical viewing sets of the two users is calculated as an interest similarity of the two users.

S504. Train and predict the feature by using a hybrid tree-encoded linear model algorithm.

The feature of the sample dataset is trained by using the hybrid tree-encoded linear model algorithm with the feature of the sample dataset as the input of the hybrid tree-encoded linear model algorithm and the interest similarity between each pair of users as the prediction target value.

The hybrid tree-encoded linear model algorithm specifically includes the following steps:

S401. Encode a feature of a sample set by using a tree model, to obtain a binary feature after encoding.

For example, training data is fitted by using a GBDT with two subtrees, and a fitting result is that the first subtree has three leaf nodes, and the second subtree has two leaf nodes. In a case that after passing through the GBDT, a sample falls into the second leaf node in the first subtree (that is, being encoded into 010, each bit corresponding to a leaf node) and falls into the first leaf node in the second subtree (that is, being encoded into 10), finally, an combined encoding result of the sample is 01010, corresponding to five binary features.

S402. Perform training through a linear model by using the feature of the sample set and the binary feature as input features.

Further, all the features after encoding, that is, the five binary features and all the original features, are put together into a linear regression model as input features for training (the training may be performed by using a gradient descent method), to obtain a final hybrid model result. The trained model is evaluated on a test dataset for prediction result, so that the performance characteristics and effect of the model can be determined.

To simplify the prediction problem, in this embodiment, the prediction target value (that is, an actual interest similarity) is binarized. That is, a similarity greater than a specific threshold is used as a positive sample, and the remaining are used as negative samples. The threshold may be preset and further adjusted during the training process. In this way, the prediction problem is essentially a binary classification problem.

The labeled sample dataset (obtained according to a method for constructing a labeled sample in this embodiment) is divided into a training set (accounting for 70%) and a test set (accounting for 30%). The AUC (Area Under the ROC Curve) value is used as the parameter to evaluate the prediction performance characteristics such as accuracy. The algorithm of the hybrid tree-encoded linear model provided in this embodiment is compared with several other common machine learning algorithms (a logistic regression algorithm, a decision tree algorithm, and a random forest algorithm), and comparison results of their prediction performances are shown in the following table:

| Algorithm | AUC value |
|---|---|
| Logistic regression | 0.783 |
| Decision tree | 0.810 |
| Random forest | 0.818 |
| Hybrid tree-encoded linear model | 0.834 |

The table above shows that compared with the logistic regression algorithm, the decision tree algorithm, and the random forest algorithm, accuracy of similarity prediction of the hybrid tree-encoded linear model provided in this embodiment of this application is notably improved.

Figure 6:
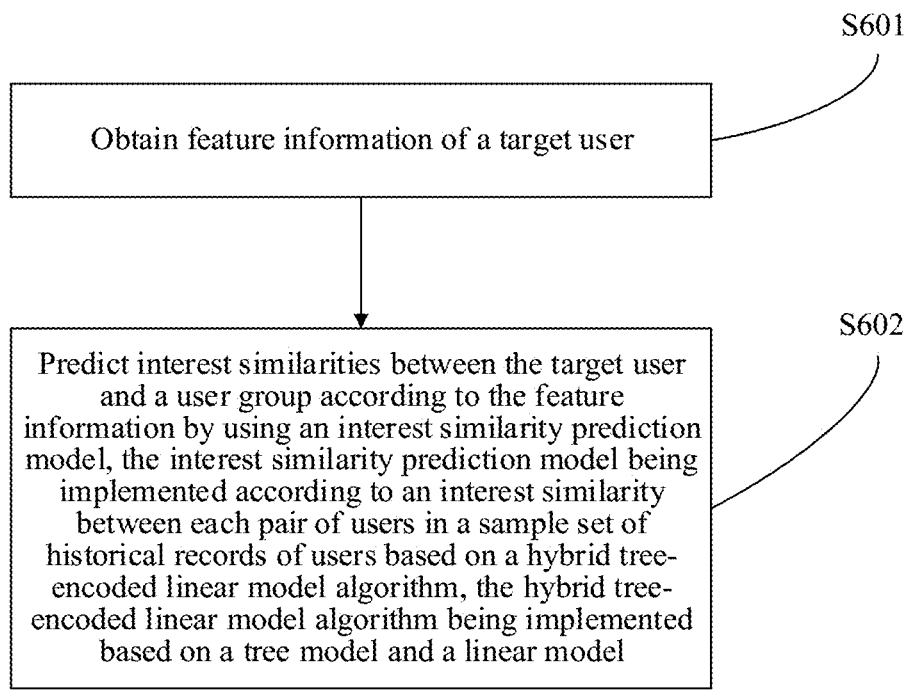
FIG. 6 is a flowchart of a method for predicting an interest similarity according to an embodiment of this application.

With regard to that a cold-start of a recommendation system results in that a similarity between a target user and a user group cannot be calculated, an embodiment of this application provides a method for predicting an interest similarity. By referring to FIG. 6, the method specifically includes the following steps.

S601. Obtain feature information of a target user.

The target user is a user of a cold-start, and may be a newly-registered user or a user with few historical records.

The feature information includes: a demographic feature, a social network software usage feature, a network behavioral feature, a social cultural background feature, a historical interest similarity feature, and the like.

The demographic feature includes at least one of the following information: an age, an age difference, a region, a gender, and the like.

The social network software use feature includes at least one of the following information: being a friend in social network software (for example QQ, WeChat, Facebook, Instagram, Twitter, Want Want, Dingding, Alipay, MSN, Weibo, or Yixin) or not, a historical interaction record (for example, a messaging frequency, a quantity of transmitted messages, a quantity of common friends, a quantity of common groups, or a quantity of mutually sent messages or emails), an online duration, a usage frequency, and the like.

The network behavioral feature includes at least one of the following information: a highly frequently browsed website, page views, a visit duration, a followed topic or official account, and the like.

The social cultural background feature includes at least one of the following information: education, a school of graduation, an occupation, a place of employment, a hobby, and the like.

The historical interest similarity feature includes at least one of the following information: an interest similarity in the past three months, an interest similarity in the past half year, an interest similarity in the past year, and the like.

The feature information may alternatively be an interest description of a user. For example, user information is pre-collected. In an embodiment, in addition to that a new user fills in some basic personal information when registering with a system, some categories or labels are set for the user to select. Alternatively, off-site behaviors of a user may be imported from other websites. For example, the user logs in by using an account of a social network site, and under the authorization by the user, some behavioral data and social network data of the user at the social network site may be imported.

S602. Predict interest similarities between the target user and a user group according to the feature information by using an interest similarity prediction model, the interest similarity prediction model being implemented according to an interest similarity between each pair of users in a sample set of historical records of users based on a hybrid tree-encoded linear model algorithm, the hybrid tree-encoded linear model algorithm being implemented based on a tree model and a linear model.

When the feature information of the target user is obtained, an interest similarity between the target user and each user in the user group is predicted by using the interest similarity prediction model. The historical records of users include historical viewing records of the users.

A method for generating an interest similarity prediction model specifically includes the following step.

S6021. Obtain a sample set of historical viewing records of users.

Since supervised machine learning is used, labeled samples need to be constructed for learning. For example, one million pairs of users are randomly selected from a historical viewing record table of the past month, and each pair of users are active users (for example, the quantity of viewed videos for a user>=30).

S6022. Construct a feature of the sample set.

To construct an effective supervised machine learning algorithm, data preparations (feature construction and selection) need to be performed separately.

As an input of machine learning algorithm, a feature of the samples needs to be constructed.

For the one million pairs of users, the following technical features may be designed, including: a demographic feature, a social network software usage feature, a network behavioral feature, a social cultural background feature, a historical interest similarity feature, and the like.

S6023. Calculate an interest similarity between each pair of users in the sample set.

An interest similarity between a user u and a user v is defined as:

$$S^I(u, v) = \frac{|I_u \cap I_v|}{\sqrt{|I_u|} * \sqrt{|I_v|}}$$

where $I_u$ and $I_v$ are respectively sets of lists of videos viewed by the user u and the user v historically (for example, in the past month). Herein, a cosine similarity between historical viewing sets of the two users is calculated as an interest similarity of the two users.

S6024. Train and predict the feature by using a hybrid tree-encoded linear model algorithm.

The feature of the sample dataset is trained by using the hybrid tree-encoded linear model algorithm with the feature of the sample dataset as the input to the hybrid tree-encoded linear model algorithm and the interest similarity between each pair of users as the prediction target value.

Figure 7:
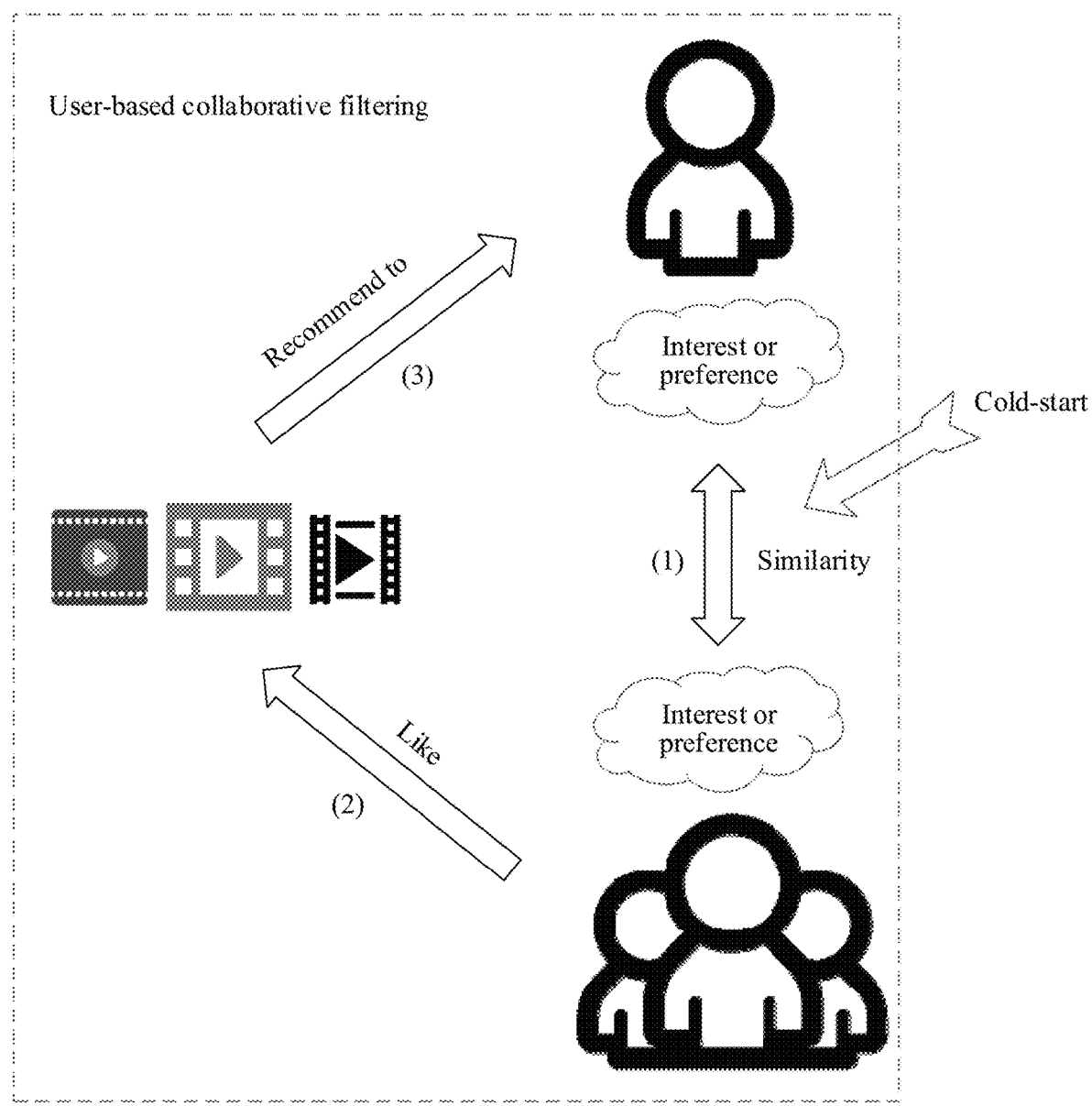
FIG. 7 is a framework diagram of a user-based CF algorithm according to an embodiment of this application.

FIG. 7 shows a framework diagram of a user-based CF algorithm. The user-based CF algorithm may be split into two steps:

finding a user set with users having an interest similar to that of a target user; and finding an item that is liked by users in the user set which the target user has not watched, and recommending the item to the target user.

Specifically, when it is needed to recommend a video to a target user, a group of users having similar interests as the target user are searched for by comparing historical viewing records of the target user and other users, and then, other videos (that the target user has not viewed) preferred by the group of users are recommended to the target user. This algorithm is simple and effective in a case that data is sufficient. However, for a new user or a target user with few viewing behaviors, because viewing preferences of the user is unknown, a user group having a similarity with the target user may not be found. Consequently, accurate video recommendation cannot be provided for the target user.

Figure 8:
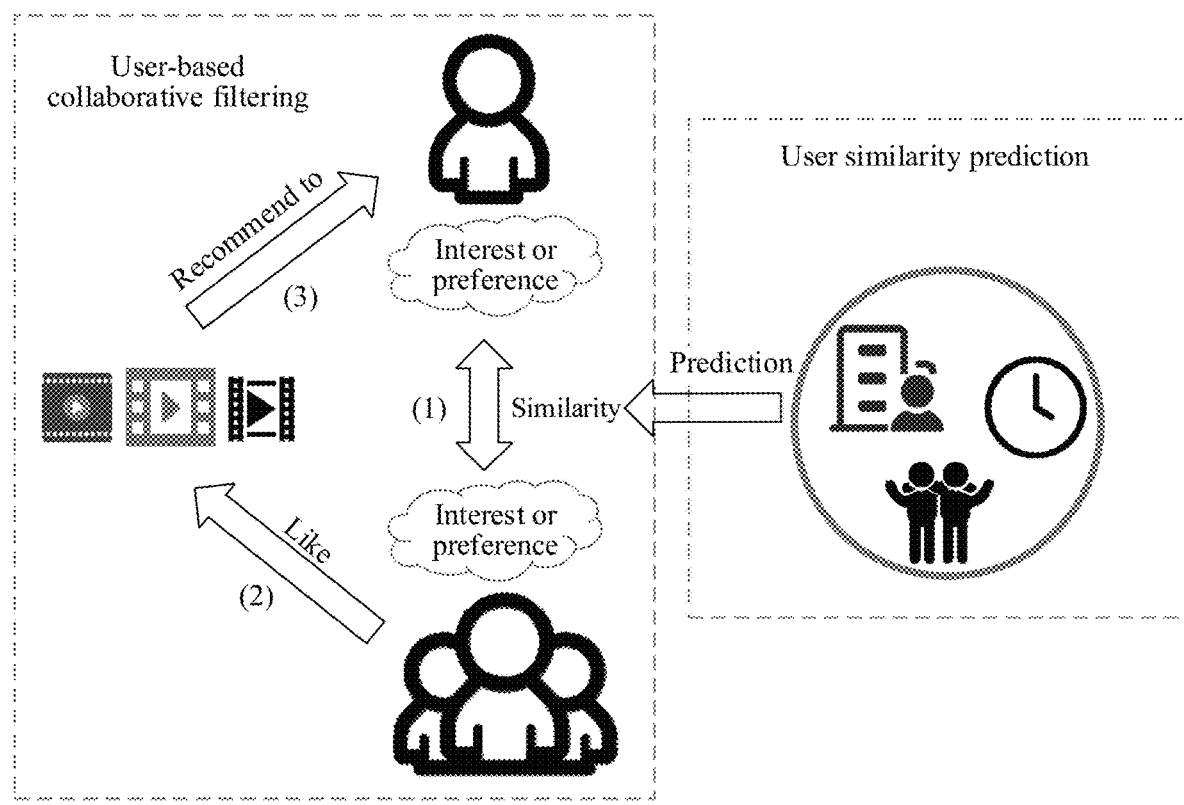
FIG. 8 is a framework diagram of an algorithm of an interest recommendation method according to an embodiment of this application.

To resolve a problem that a cold-start of a recommendation system results in that an interest similarity between users cannot be calculated, and further causes the CF algorithm to fail, an embodiment of this application provides an interest recommendation method, that is, an enhanced user-based CF algorithm. For a framework diagram of the algorithm, refer to FIG. 8. An interest similarity between users is predicted by using a supervised machine learning method, so that the user-based CF algorithm is enhanced.

Figure 9:
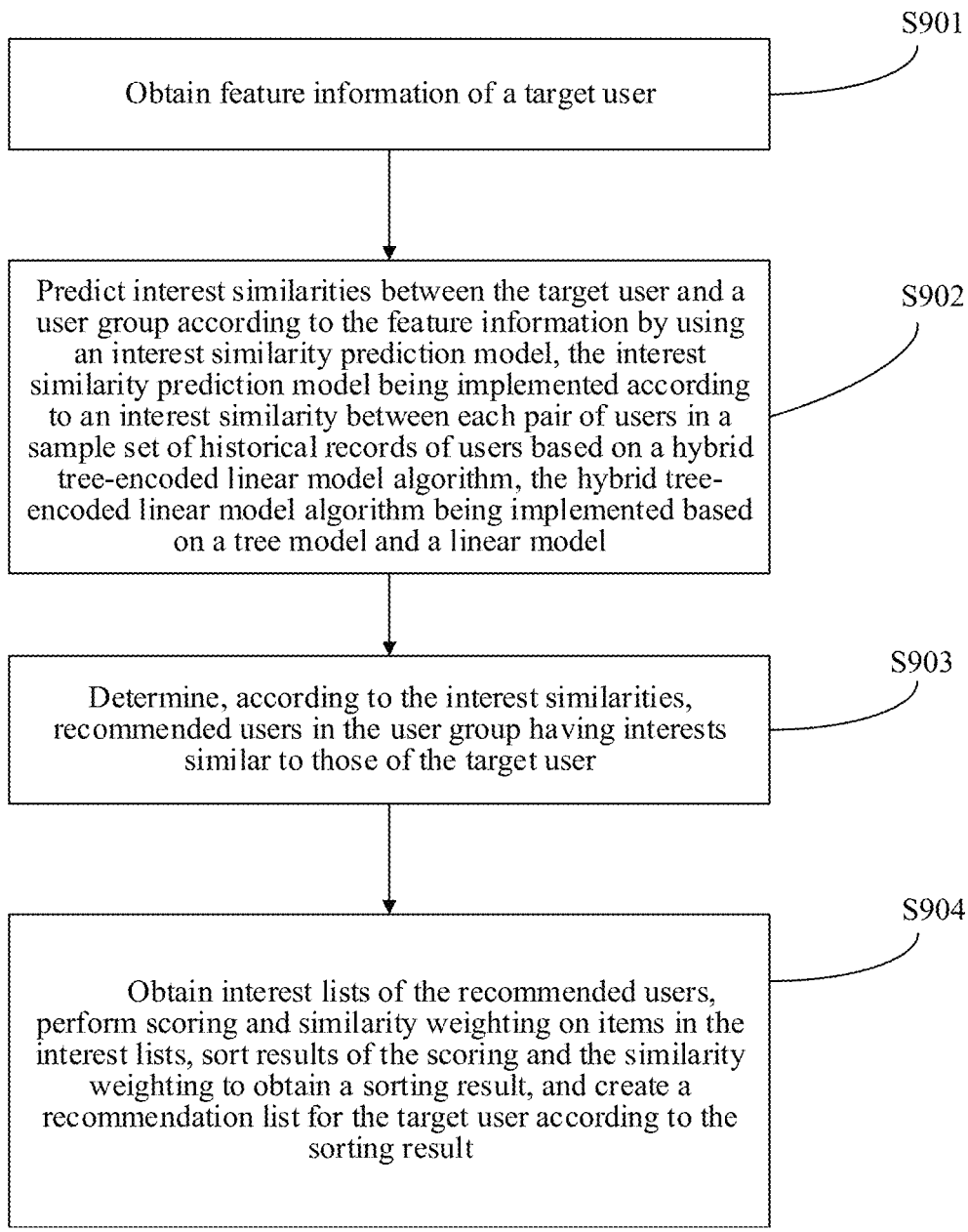
FIG. 9 is a flowchart of an interest recommendation method according to an embodiment of this application.
Figure 10:
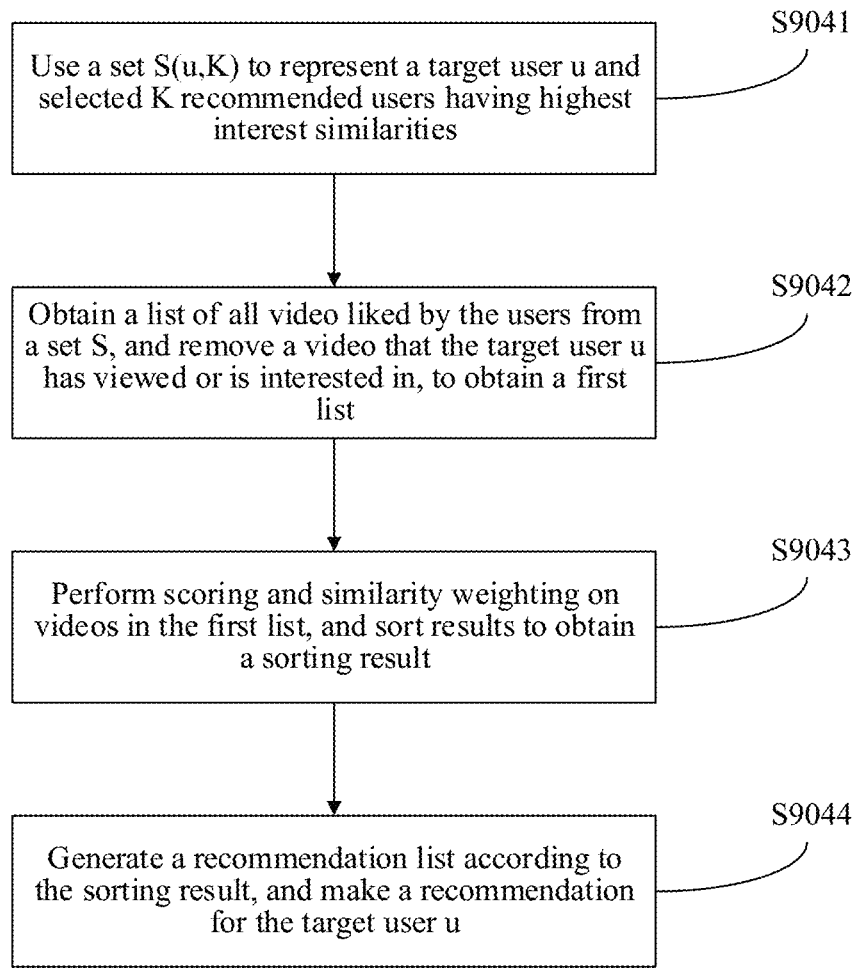
FIG. 10 is a flowchart of a method for generating a video recommendation list according to an embodiment of this application.

Referring FIG. 9, an interest recommendation method specifically includes the following steps.

S901. Obtain feature information of a target user.

The target user is a user of a cold-start, and may be a newly-registered user or a user with few historical records.

The feature information includes:

for example, a demographic feature, a social network software network usage feature, a network behavioral feature, a social cultural background feature, and a historical interest similarity feature.

The demographic feature includes at least one of the following information: an age, an age difference, a region, a gender, and the like.

The social network software use feature includes at least one of the following information: being a friend in social network software (for example QQ, WeChat, Want Want, Facebook, Instagram, Twitter, Dingding, Alipay, MSN, Weibo, or Yixin) or not, a historical interaction record (for example, a messaging frequency, a quantity of transmitted messages, a quantity of common friends, a quantity of common groups, or a quantity of mutually sent messages or emails), an online duration, a usage frequency, and the like.

The network behavioral feature includes at least one of the following information: a highly frequently browsed website, page views, a visit duration, a followed topic or official account, and the like.

The social cultural background feature includes at least one of the following information: education, a school of graduation, an occupation, a place of employment, a hobby, and the like.

The historical interest similarity feature includes at least one of the following information: an interest similarity in the past three months, an interest similarity in the past half year, an interest similarity in the past year, and the like.

The feature information may alternatively be an interest description of a user. For example, user information is pre-collected. In an embodiment, in addition to that a new user fills in some basic personal information when registering with a system, some categories or labels are set for the user to select. Alternatively, off-site behaviors of a user may be imported from other websites. For example, the user logs in by using an account of a social network site, and under the authorization by the user, some behavioral data and social network data of the user at the social network site may be imported.

S902. Predict interest similarities between the target user and a user group according to the feature information by using an interest similarity prediction model, the interest similarity prediction model being implemented according to an interest similarity between each pair of users in a sample set of historical records of users based on a hybrid tree-encoded linear model algorithm, the hybrid tree-encoded linear model algorithm being implemented based on a tree model and a linear model.

When the feature information of the target user is obtained, an interest similarity between the target user and each user in the user group is predicted by using the interest similarity prediction model. The historical records of users include historical viewing records of the users.

A method for generating an interest similarity prediction model specifically includes the following step.

S9021. Obtain a sample set of historical viewing records of users.

Since supervised machine learning is used, labeled samples need to be constructed for learning. For example, one million pairs of users are randomly selected from a historical viewing record table of the past month, and each pair of users are active users (for example, the quantity of viewed videos for a user >=30).

S9022. Construct a feature of the sample set.

To construct an effective supervised machine learning algorithm, data preparations (feature construction and selection) need to be performed separately.

As an input of machine learning algorithm, a feature of the samples needs to be constructed.

For the one million pairs of users, three types of features are designed: a demographic feature, a social feature, and a historical interest feature.

S9023. Calculate an interest similarity between each pair of users in the sample set.

An interest similarity between a user u and a user v is defined as:

$$S^I(u, v) = \frac{|I_u \cap I_v|}{\sqrt{|I_u|} * \sqrt{|I_v|}}$$

where $I_u$ and $I_v$ are respectively sets of lists of videos viewed by the user u and the user v historically (for example, in the past month). Herein, a cosine similarity between historical viewing sets of the two users is calculated as an interest similarity of the two users.

S9024. Train the feature of the sample set by using the hybrid tree-encoded linear model algorithm with the feature of the sample set as an input of the hybrid tree-encoded linear model algorithm and the interest similarity between each pair of users as a prediction target value.

Step S9024 further includes the following sub-steps:

encoding the feature of the sample set by using the tree model, to obtain a binary feature after encoding; and performing training through the linear model by using the feature of the sample set and the binary feature as input features.

S903. Determine, according to the interest similarities, recommended users in the user group having interests similar to those of the target user.

After interest similarities between the target user and each of the users in the user group are obtained, the similarities are sorted in descending order, and K users having highest similarities with the target user are selected as recommended users. K is an integer herein, and a specific value may be set according to a specific requirement.

S904. Obtain interest list of the recommended users, and create a recommendation list for the target user according to the interest list.

Specifically, the interest list of the recommended users may be obtained, scoring and similarity weighting are performed on items in the interest list, results of the scoring and the similarity weighting are sorted to obtain a sorting result, and the recommendation list is created for the target user according to the sorting result.

The recommendation list includes a list of videos that the recommended users are interested and that the target user has not viewed.

Based on the foregoing user-based CF algorithm, after a recommended user having an interest similar to that of the target user is determined, using video recommendation as an example, the method specifically includes the following steps:

S9041. Use a set S(u,K) to represent a target user u and the selected K recommended users having highest interest similarities.

S9042. Obtain a list of all videos liked by the users from a set S, and remove the videos that the target user u has viewed already or is interested in, to obtain a first list.

S9043. Perform scoring and similarity weighting on videos in the first list, and sort results to obtain a sorting result.

S9044. Generate a recommendation list according to the sorting result, and make a recommendation for the target user u.

A degree at which the user u is interested in each possibly recommended video i may be calculated by using the following formula:

$$p(x, u) = \sum_{v \in S(u, K) \cap N(i)} w_{uv} \times r_{vi}$$

where $r_{vi}$ represents a degree at which the user v likes the video i, that is, a score given to i, and $w_{uv}$ represents a similarity between the user u and V.

The CF recommendation system usually needs to process millions or even billions of data records. How to access the massive data and quickly calculate a recommendation result becomes a huge challenge that the CF faces. A distribution technology is used in cloud computing. A cloud system is constructed based on a large quantity of server clusters, and obtains computing and storage capabilities equivalent to those of a high-performance computer through large-scale clusters. Management of the clusters improves expandability of the system. A combination of the CF and the cloud computing technology enables the CF recommendation system to have a stronger parallel computing capability, stronger fault tolerance, and higher commendation real-time performance.

Figure 11:
FIG. 11 is a schematic diagram of a user interface according to an embodiment of this application.

An interest recommendation method provided in this application may be applied to a personalized recommendation module of a video website or a video App. Referring to FIG. 11, for example, providing a user a video list satisfying the viewing interest of the user, to implement an "adaptability and diversity" feature of the personalized recommendation module. User experience is improved and highly personalized, and user stickiness and loyalty is enhanced.

Figure 12:
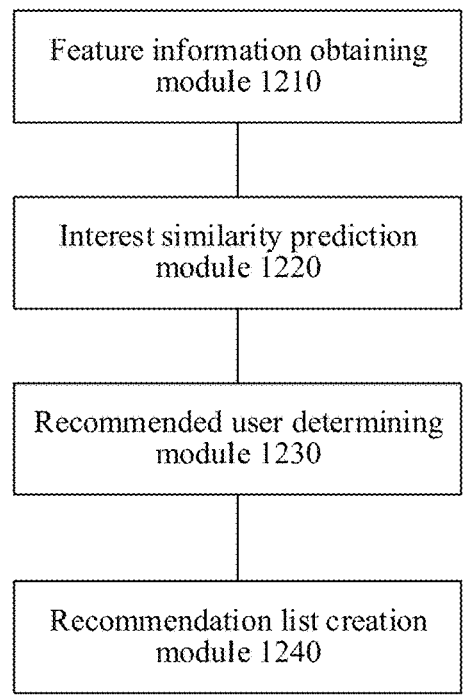
FIG. 12 is a schematic structural diagram of a computer device according to an embodiment of this application.

Correspondingly, an embodiment of this application further provides interest recommendation apparatus. Referring to FIG. 12, the interest recommendation apparatus specifically includes a feature information obtaining module 1210, an interest similarity prediction module 1220, a recommended user determining module 1230, and a recommendation list creation module 1240.

A feature information obtaining module 1210 is configured to obtain feature information of a target user.

The interest similarity prediction module 1220 is configured to predict interest similarities between the target user and users of a user group according to the feature information by using an interest similarity prediction model, the interest similarity prediction model being implemented according to an interest similarity between each pair of users in a sample set of historical records of users based on a hybrid tree-encoded linear model algorithm, the hybrid tree-encoded linear model algorithm being implemented based on a tree model and a linear model.

The recommended user determining module 1230 is configured to determine, according to the interest similarities, recommended users in the user group having interests similar to those of the target user. The recommended user determining module 1230 further includes a sorting module 1231, configured to sort the interest similarities between the target user and each of users in the user group in descending order, and select several users that rank the highest as recommended users. The number of selected recommended users may be preset and may be adjusted based on requirement.

The recommendation list creation module 1240 is configured to obtain interest list of the recommended users, and create a recommendation list for the target user according to the interest list. The recommendation list creation module 1240 includes a scoring and weighting module 1241 and a list generation module 1242. The scoring and weighting module 1241 is configured to obtain the interest list of the recommended users and perform scoring and similarity weighting on items in the interest list. The list generation module 1242 is configured to sort results of the scoring and the similarity weighting to obtain a sorting result, and generate the recommendation list according to the sorting result.

Further, the interest similarity prediction module 1220 includes a prediction model generation module 1221, configured to generate a prediction model based on an interest similarity of the feature information.

Figure 13:
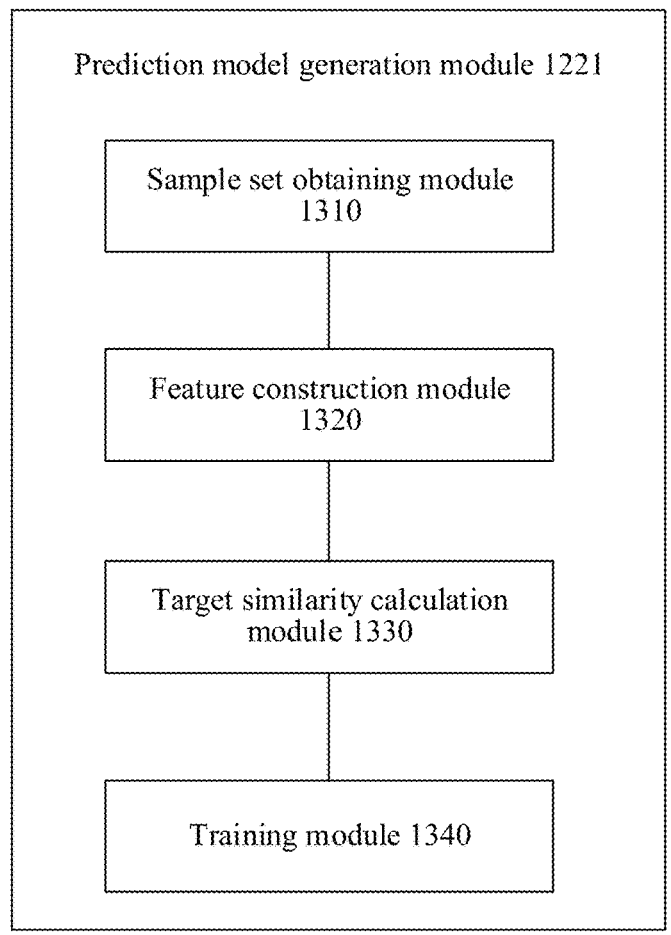
FIG. 13 is a schematic structural diagram of a prediction model generation module according to an embodiment of this application.

Referring to FIG. 13, the prediction model generation module 1221 further includes:

a sample set obtaining module 1310, configured to obtain a sample set of historical viewing records of users;

a feature construction module 1320, configured to construct a feature of the sample set;

a target similarity calculation module 1330, configured to calculate an interest similarity between each pair of users in the sample set according to a cosine similarity formula:

$$S^l(u, v) = \frac{|I_u \cap I_v|}{\sqrt{|I_u|} * \sqrt{|I_v|}}$$

u representing a first user, V representing a second user, $I_u$ and $I_v$ being historical video viewing list sets of the first user and the second user respectively; and a training module 1340, configured to train the feature of the sample set by using the hybrid tree-encoded linear model algorithm with the feature of the sample set as an input of the hybrid tree-encoded linear model algorithm and the interest similarity between each pair of users as a prediction target value.

Figure 14:
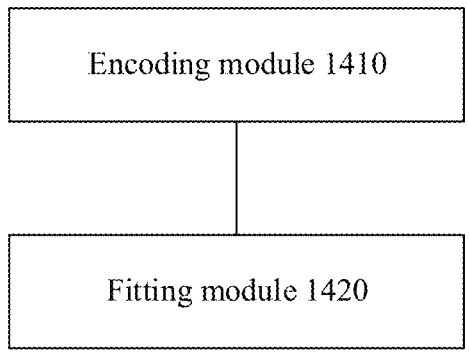
FIG. 14 is a schematic structural diagram of a hybrid tree-encoded linear model module according to an embodiment of this application.

Referring to FIG. 14, the hybrid tree-encoded linear model algorithm specifically includes:

an encoding module 1410, configured to encode a feature of a sample set by using a tree model, to obtain a binary feature after encoding; and a fitting module 1420, configured to perform training through a linear model by using the feature of the sample set and the binary feature as input features.

Figure 15:
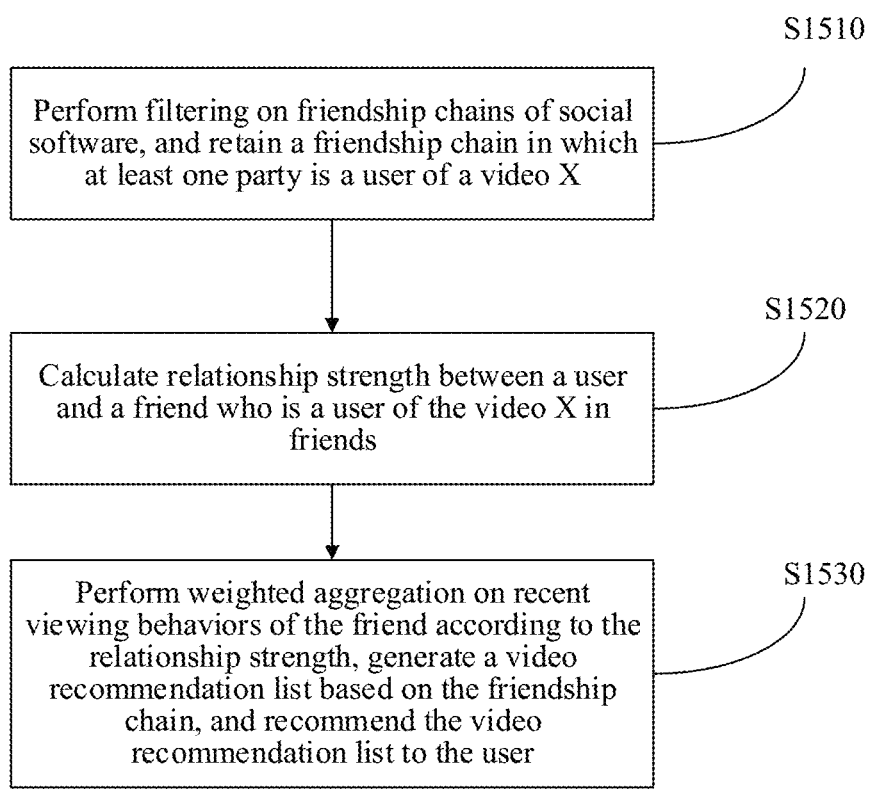
FIG. 15 is a flowchart of a video recommendation method based on a friendship chain of social network software according to an embodiment of this application.

An embodiment of this application further provides a video recommendation method based on a friendship chain of social network software. Referring to FIG. 15, the method includes the following steps.

S1510. Perform filtering on friendship chains of social network software, and retain friendship chains in which at least one party is a user of a video X. That is, a user has viewed the video X.

To reduce huge difficulty in calculating friendship chains of social network software, some users are first filtered, and only friendship chains in which at least one party is a user of a video X are retained.

S1520. Calculate relationship strength between a user and a friend who has viewed the video X.

With regard to the relationship strength and intimacy, there are two methods for calculating the relationship strength and the intimacy:

(1) Long term: intimacy calculated based on long-term social network interaction.

(2) Short term: intimacy calculated based on a recent communication frequency under a social network software. Disadvantages of using short-term intimacy are that some friends caused by business communications may be included, and the sparsity is relatively large (the quantity of friends in communication is usually small within a short term, for example, 30 days). Therefore, final candidates for friend video recommendation need to be selected by comprehensively considering long-term intimacy and short-term intimacy.

S1530. Perform weighted aggregation on recent viewing behaviors of the friends according to the relationship strength, generate a video recommendation list based on the friendship chain, and recommend the video recommendation list to the user.

Figure 16:
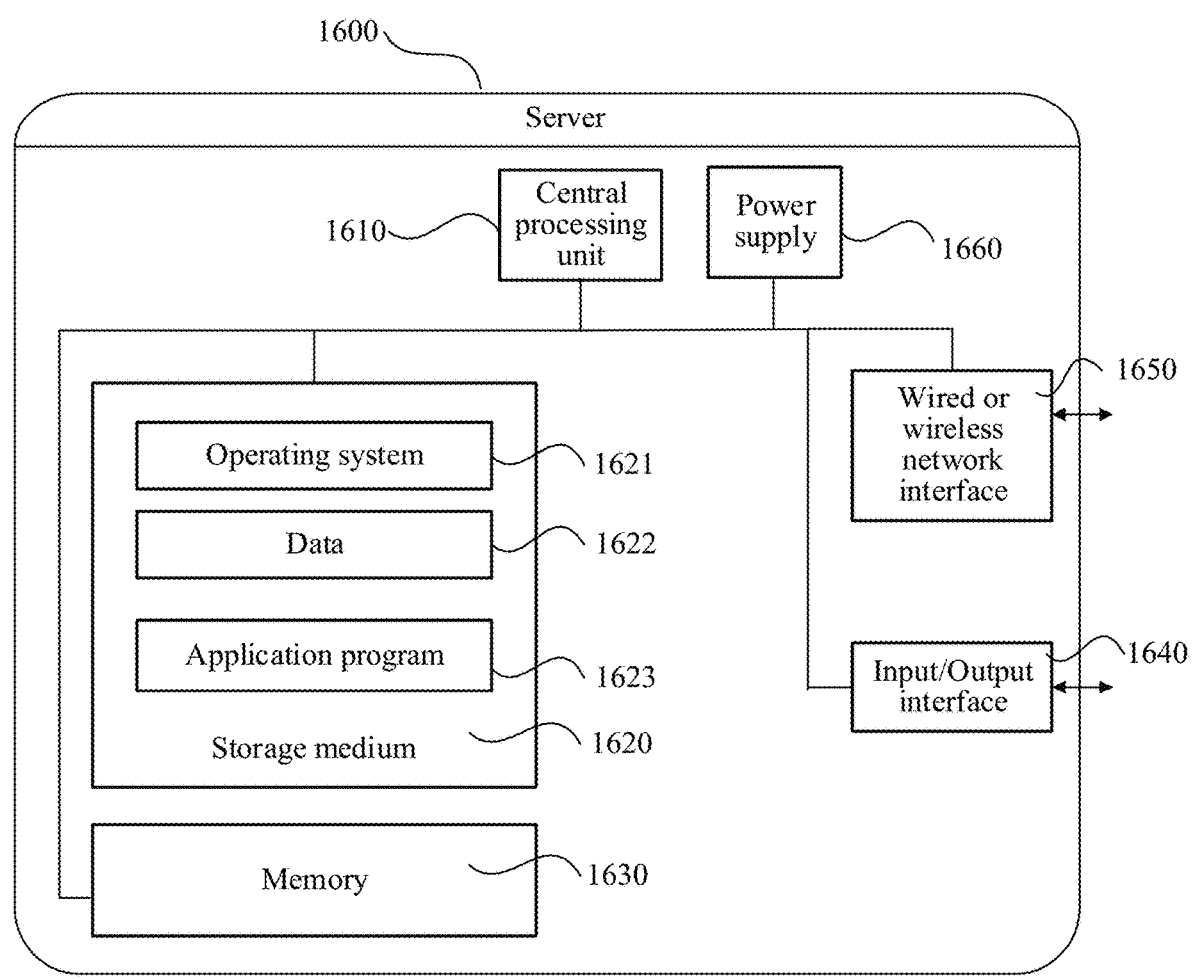
FIG. 16 is a schematic architectural diagram of a computer device according to an embodiment of this application.

An embodiment of this application further provides a server. FIG. 16 shows a schematic structural diagram of the server. The server is configured to implement the method for handling a cold-start in a recommendation system provided in the foregoing embodiment. Specifically, a structure of the server may include an apparatus for handling a cold-start in a recommendation system.

The server 1600 may vary considerably depending on different configurations or performance, and may include one or more central processing units (CPUs) 1610 (for example, one or more processors), a memory 1630, and one or more computer-readable storage mediums 1620 (for example, one or more massive storage devices) storing an application program 1623 or data 1622. The memory 1630 and the computer-readable storage medium 1620 may provide transitory storage or persistent storage. The program stored in the computer-readable storage media 1620 may include one or more modules, and each module may include a series of instructions on the server. Still further, the central processing unit 1610 may be configured to communicate with the computer-readable storage medium 1620 to execute the series of instruction operations in the computer-readable storage medium 1620 on the server 1600. The server 1600 may further include one or more power supplies 1660, one or more wired or wireless network interfaces 1650, one or more input/output interfaces 1640, and/or one or more operating systems 1621 such as Windows Server, Mac OS, Unix, Linux, and FreeBSD.

An embodiment of this application further provides a computer-readable storage medium. The computer-readable storage medium can store program code of the method for handling a cold-start in a recommendation system in the foregoing method embodiments. The program code may be configured to implement:

obtaining feature information of a target user;

predicting interest similarities between the target user and a user group according to the feature information by using an interest similarity prediction model, the interest similarity prediction model being implemented based on a hybrid tree-encoded linear model algorithm;

determining, according to the interest similarities, recommended users in the user group having interests similar to those of the target user; and obtaining an interest list of the recommended users, and creating a recommendation list for the target user according to the interest list.

Optionally, in this embodiment, the computer-readable storage medium may be located in at least one of a plurality of network devices of a computer network. Optionally, in this embodiment, the computer-readable storage medium may include, but is not limited to, various media such as a USB flash drive, a read-only memory (ROM), a random access memory (RAM), a removable hard disk, a magnetic disk, and an optical disc that can store the program code.

In this application, feature information of a target user is obtained, interest similarities between the target user and a user group are predicted according to the feature information by using a supervised machine learning algorithm, recommended users in the user group having interests similar to those of the target user are determined according to the interest similarities, and further a recommendation list is created for the target user according to interest list of the recommended users. This application resolves a cold-start problem of a conventional CF algorithm, that is, a recommendation problem when a user does not have sufficient historical viewing records, improves accuracy of a recommendation result, significantly increases a click-through rate, and implements "adaptability and diversity" of personalized recommendation.

The structure shown in this embodiment is only a partial structure related to the solution of this application, and does not constitute a limitation to the device to which the solution of this application is applied. Specifically, the device may include more or fewer components than those shown in the figure, or some components may be combined, or a different component deployment may be used.

A person of ordinary skill in the art may understand that some or all procedures in the method in the foregoing embodiments may be implemented by a computer-readable instruction instructing related hardware, and the program may be stored in a non-transitory computer-readable storage medium. For example, in the embodiments of this application, the program may be stored in a non-transitory storage medium of a computer system, and may be executed by at least one processor in the computer system, to implement the procedures of embodiments including, for example, the foregoing methods. The storage medium may be a magnetic disk, an optical disc, a read-only memory (ROM), a random access memory (RAM), or the like.

The technical features in the foregoing embodiments may be randomly combined. For concise description, not all possible combinations of the technical features in the embodiments are described. However, as long as combinations of the technical features do not conflict with each other, the combinations of the technical features are considered as falling within the scope described in this specification.

The foregoing embodiments only show several implementations of this application and are described in detail, but they are not to be construed as a limit to the patent scope of this application. A person of ordinary skill in the art may further make variations and improvements without departing from the ideas of this application, and the variations and improvements shall fall within the protection scope of this application. Therefore, the protection scope of this patent application is subject to the protection scope of the appended claims.

What is claimed is:

1. An interest recommendation method, performed by a computer device, the method comprising:
    filtering friendship chains of a target user and retaining friendship chains in which at least one party is a user of a predetermined video, to obtain a user group based on the retained friendship chains, wherein the target user is a cold-start user in a recommendation system and there is no behavioral data for the target user, and wherein the recommendation system is capable of creating a recommendation list for the target user, the recommendation list comprising a list of videos:
    obtaining feature information of the target user;
    predicting interest similarities between the target user and the user group in the recommendation system according to the feature information by using an interest similarity prediction model, the interest similarity prediction model being implemented according to an interest similarity between each pair of users in a sample set of historical records of users based on a hybrid tree-encoded linear model algorithm, the hybrid tree-encoded linear model algorithm being implemented based on a tree model and a linear model, wherein:
    the feature information comprises a network behavioral information and a social cultural background information;
    the network behavioral information comprises: a highly frequently browsed website, page views, a visit duration, and a followed topic or official account; and
    the social cultural background information comprises: an education, a school of graduation, an occupation, a place of employment, and a hobby;
    determining, according to the interest similarities, recommended users in the user group having interests similar to those of the target user; and
    obtaining the interest list of the recommended users;
    performing scoring and similarity weighting on items in the interest list;
    sorting results of the scoring and the similarity weighting to obtain a sorting result; and
    creating the recommendation list for the target user according to the sorting result, wherein the recommendation list comprising a list of videos that the recommended users are interested in and that the target user has not viewed.

2. The interest recommendation method according to claim 1, wherein the feature information further comprises at least one type of feature information of the following: a demographic feature, a social network software usage feature, or a historical interest similarity feature.

3. The interest recommendation method according to claim 1, wherein the interest similarity prediction model is generated through the following operations:
    obtaining a sample set of historical viewing records of the users;
    constructing a feature of the sample set;
    calculating an interest similarity between each pair of users in the sample set according to a cosine similarity formula:

$$S^I(u, v) = \frac{|I_u \cap I_v|}{\sqrt{|I_u|} * \sqrt{|I_v|}}$$

U representing a first user, V representing a second user, $I_u$ and $I_v$ being historical video viewing list sets of the first user and the second user respectively; and
    training the feature of the sample set by using the hybrid tree-encoded linear model algorithm with the feature of the sample set as an input of the hybrid tree-encoded linear model algorithm and the interest similarity between each pair of users as a prediction target value.

4. The interest recommendation method according to claim 3, wherein training the feature of the sample set by using the hybrid tree-encoded linear model algorithm comprises:
    encoding the feature of the sample set by using the tree model, to obtain a binary feature; and
    performing training through the linear model by using the feature of the sample set and the binary feature as input features.

5. The interest recommendation method according to claim 1, wherein determining, according to the interest similarities comprises:
    sorting users in the user group according to the interest similarities between the target user and each user in the user group in descending order to obtain a sorted user group; and
    selecting a predefined number of users according to their ranking in the sorted user group in descending order.

6. A computer device for interest recommendation, comprising a memory for storing a computer readable instruction and a processor in communication with the memory, the computer readable instruction, when executed by the processor, causing the processor to perform the following operations:
    filtering friendship chains of a target user and retaining friendship chains in which at least one party is a user of a predetermined video, to obtain a user group based on the retained friendship chains, wherein the target user is a cold-start user in a recommendation system and there is no behavioral data for the target user, and wherein the recommendation system is capable of creating a recommendation list for the target user, the recommendation list comprising a list of videos:
    obtaining feature information of the target user;
    predicting interest similarities between the target user and a user group in the recommendation system according to the feature information by using an interest similarity prediction model, the interest similarity prediction model being implemented according to an interest similarity between each pair of users in a sample set of historical records of users based on a hybrid tree-encoded linear model algorithm, the hybrid tree-encoded linear model algorithm being implemented based on a tree model and a linear model, wherein:

the feature information comprises a network behavioral information and a social cultural background information;

the network behavioral information comprises: a highly frequently browsed website, page views, a visit duration, and a followed topic or official account; and the social cultural background information comprises: an education, a school of graduation, an occupation, a place of employment, and a hobby;

determining, according to the interest similarities, recommended users in the user group having interests similar to those of the target user; and obtaining the interest list of the recommended users;

performing scoring and similarity weighting on items in the interest list;

sorting results of the scoring and the similarity weighting to obtain a sorting result; and creating the recommendation list for the target user according to the sorting result, wherein the recommendation list comprising a list of videos that the recommended users are interested in and that the target user has not viewed.

7. The computer device according to claim 6, wherein the feature information further comprises at least one type of feature information of the following: a demographic feature, a social network software usage feature, or a historical interest similarity feature.

8. The computer device according to claim 6, wherein the interest similarity prediction model is generated through the following operations:

obtaining a sample set of historical viewing records of the users;

constructing a feature of the sample set;

calculating an interest similarity between each pair of users in the sample set according to a cosine similarity formula:

$$S^l(u, v) = \frac{|I_u \cap I_v|}{\sqrt{|I_u|} * \sqrt{|I_v|}}$$

U representing a first user, V representing a second user, $I_u$ and $I_v$ being historical video viewing list sets of the first user and the second user respectively; and training the feature of the sample set by using the hybrid tree-encoded linear model algorithm with the feature of the sample set as an input of the hybrid tree-encoded linear model algorithm and the interest similarity between each pair of users as a prediction target value.

9. The computer device according to claim 8, wherein training the feature of the sample set by using the hybrid tree-encoded linear model algorithm comprises:

encoding the feature of the sample set by using the tree model, to obtain a binary feature after encoding; and performing training through the linear model by using the feature of the sample set and the binary feature as input features.

10. The computer device according to claim 6, wherein determining, according to the interest similarities comprises:

sorting users in the user group according to the interest similarities between the target user and each user in the user group in descending order to obtain a sorted user group; and selecting a predefined number of users according to their ranking in the sorted user group in descending order.

11. A non-transitory computer-readable storage medium, storing a computer-readable instruction, the computer-readable instruction, when executed by one or more processors, causing the one or more processors to perform the following operations:

filtering friendship chains of a target user and retaining friendship chains in which at least one party is a user of a predetermined video, to obtain a user group based on the retained friendship chains, wherein the target user is a cold-start user in a recommendation system and there is no behavioral data for the target user, and wherein the recommendation system is capable of creating a recommendation list for the target user, the recommendation list comprising a list of videos:

obtaining feature information of the target user;

predicting interest similarities between the target user and a user group in the recommendation system according to the feature information by using an interest similarity prediction model, the interest similarity prediction model being implemented according to an interest similarity between each pair of users in a sample set of historical records of users based on a hybrid tree-encoded linear model algorithm, the hybrid tree-encoded linear model algorithm being implemented based on a tree model and a linear model, wherein:

the feature information comprises a network behavioral information and a social cultural background information;

the network behavioral information comprises: a highly frequently browsed website, page views, a visit duration, and a followed topic or official account; and the social cultural background information comprises: an education, a school of graduation, an occupation, a place of employment, and a hobby;

determining, according to the interest similarities, recommended users in the user group having interests similar to those of the target user; and obtaining the interest list of the recommended users;

performing scoring and similarity weighting on items in the interest list;

sorting results of the scoring and the similarity weighting to obtain a sorting result; and creating the recommendation list for the target user according to the sorting result, wherein the recommendation list comprising a list of videos that the recommended users are interested in and that the target user has not viewed.

12. The storage medium according to claim 11, wherein the feature information further comprises at least one type of feature information of the following: a demographic feature, a social network software use feature, and a historical interest similarity feature.

13. The storage medium according to claim 11, wherein the interest similarity prediction model is generated through the following operations:

obtaining a sample set of historical viewing records of the users;

constructing a feature of the sample set;

calculating an interest similarity between each pair of users in the sample set according to a cosine similarity formula:

$$S^I(u, v) = \frac{|I_u \cap I_v|}{\sqrt{|I_u|} * \sqrt{|I_v|}}$$

U representing a first user, V representing a second user, $I_u$ and $I_v$ being historical video viewing list sets of the first user and the second user respectively; and training the feature of the sample set by using the hybrid tree-encoded linear model algorithm with the feature of the sample set as an input of the hybrid tree-encoded linear model algorithm and the interest similarity between each pair of users as a prediction target value.

14. The storage medium according to claim 13, wherein training the feature of the sample set by using the hybrid tree-encoded linear model algorithm comprises:
  encoding the feature of the sample set by using the tree model, to obtain a binary feature; and
  performing training through the linear model by using the feature of the sample set and the binary feature as input features.

15. The storage medium according to claim 11, wherein determining, according to the interest similarities comprises:
  sorting users in the user group according to the interest similarities between the target user and each user in the user group in descending order to obtain a sorted user group; and
  selecting a predefined number of users according to their ranking in the sorted user group in descending order.

* * * * *